March 15, 1960 K. A. KLINGLER 2,928,351
METERING PUMP

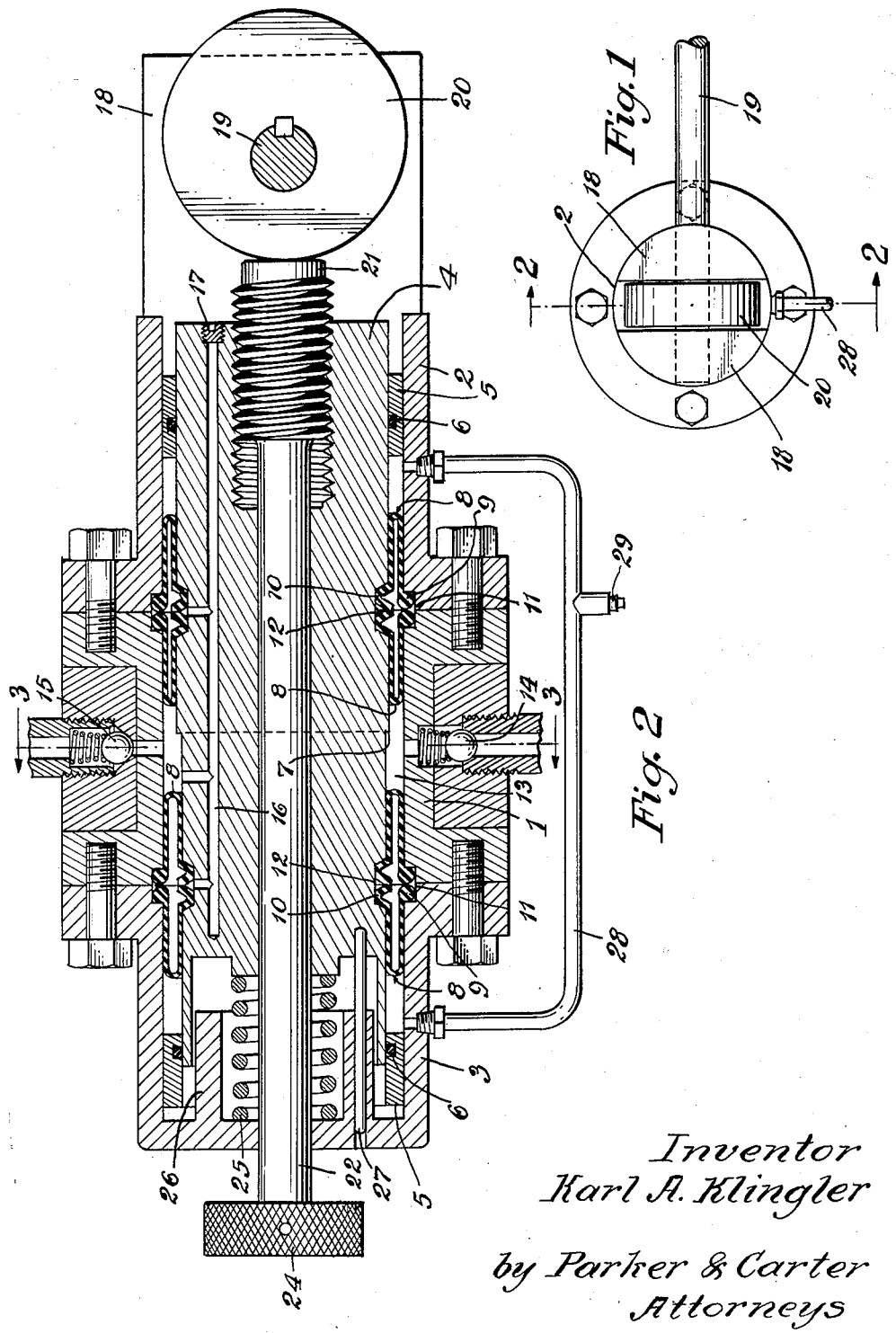

Filed Nov. 13, 1956 2 Sheets-Sheet 2

Inventor
Karl A. Klingler
by Parker & Carter
Attorneys

2,928,351

METERING PUMP

Karl A. Klingler, Naperville, Ill.

Application November 13, 1956, Serial No. 621,647

5 Claims. (Cl. 103—37)

My invention relates to improvements in metering pumps and has for one object to provide a metering pump which will give a wide range of accuracy under wide ranges of pressure variation and wherein the output may be adjusted between zero and maximum discharge.

Another object of the invention is to provide a pump wherein output may be accurately adjusted between maximum and zero discharge without change in the length of pump stroke.

Other objects of the invention will appear from time to time throughout the specification and claims.

The invention is illustrated more or less diagrammatically in the accompanying drawings, wherein—

Figure 1 is an end elevation;

Figure 2 is a section along the line 2—2 of Figure 1;

Like parts are indicated by like characters throughout the specification and drawings.

Figure 3:
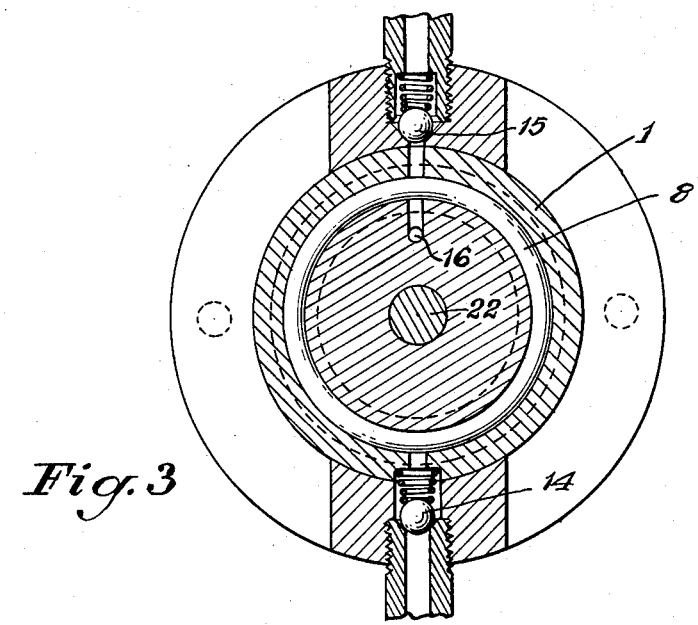
Figure 3 is a section along the line 3—3 of Figure 2.
Figure 4:
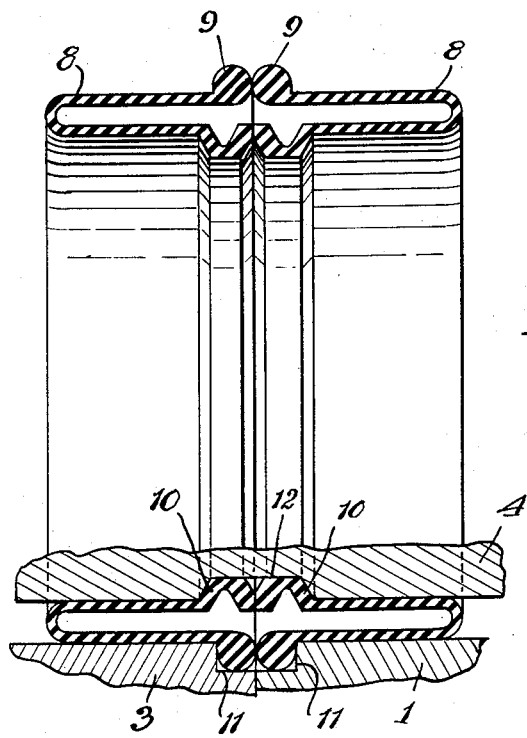
Figure 4 is an enlarged detail of the packing means.

The pump cylinder 1, the open ended guide cylinder 2 and the closed end guide cylinder 3 are all flanged and bolted together to define a pump body having a cylindrical chamber of uniform interior diameter extending from end to end. The cylindrical pump plunger 4 is held in concentric alignment with the cylinder by bearing sleeves 5, one mounted in each of the guide cylinders. O-packing rings 6 are interposed between the bearing sleeves and the plunger adjacent the opposite ends of the plunger.

The plunger 4 has one end, in this case the right hand end in Figure 2, of greater diameter than the other end, there being a shoulder 7 perpendicular to the axis of the plunger caused by the difference in diameter. The internal diameter of the cylinder is greater than the greater diameter of the plunger. An annular packing member is interposed in the annular space between the plunger and the cylinder adjacent each end of the pump chamber cylinder. This packing means takes the form of two substantially identical tubes 8 of elastomeric material. These tubes are flanged at each end as at 9, 10, one flange being of larger diameter than the other, turned back upon themselves and the flanges 9, 10 are socketed or anchored in annular grooves 11, 12 defined respectively in the inner periphery of the cylinder and the outer periphery of the plunger. These tubes thus form packing bags, which extend in opposite directions away from their anchorages and are widely extended in the annular space between the cylinder and the plunger. The opposed packing means define with the plunger and the cylinder 1, the pump chamber 13. 14 is an intake and 15 an exhaust check valve for the pump chamber.

16 is a duct extending longitudinally of the plunger having a plurality of radial branches. At least one branch communicates with the pump chamber 13 and at least one branch communicates with the interior of each of the packing bags defined by the sleeves 8 so that packing fluid under pressure may travel from the pump chamber to and be forced into the packing bag spaces. The opposed lips of the sleeves 8 where they are flanged at 10 furnish a check valve so that drop in pressure will not permit escape of packing fluid from the bag. A filler plug 17 at one end of the duct 16 makes it possible to initially fill the packing area after which pump action will normally maintain the packing bags in extended position, filling the annular packing space between plunger and cylinder.

The guide cylinder 2 carries pillow blocks 18 which furnish a bearing for the cam or eccentric shaft 19 which may be driven by any suitable source of power and rotates the cam 20 in opposition to the tappet 21. The tappet 21 is threaded in the plunger 4 and projects beyond the drive end thereof. An adjusting stem 22 extends outwardly through the closed end of the cylinder 3 and is provided with a knurled adjustment button 24 so that the operator may vary the distance through which the tappet 21 projects beyond the end of the plunger 4. A spring 25 is compressed between the cylinder 3 and the plunger and held in position by the integral cup 26 in opposition to the throw of the cam. A pin 27 is socketed in the cylinder 3 in slidable relationship with the plunger so that while the plunger is free to reciprocate, it is held against rotation. The plunger is skirted to enclose the guide sleeve 26 and furnish an abutment for the packing bag at the inboard end of the plunger.

A duct 28 extends between the cylinders 2 and 3 bypassing the pump cylinder chamber 1. This duct communicates with the spaces between the O-ring and the adjacent packing bag on each end of the pump so that pressure may be equalized between such chambers and a filler plug 29 is provided whereby make up fluid if necessary can be forced into the spaces between the O-rings and their respective packing bags.

The use and operation of the invention are as follows:

Starting with the ports shown in Figure 2, the plunger is at the right hand of its excursion. As the cam rotates, it will move the plunger to the left. As the plunger moves to the left, each packing bag on the forward side of the anchorage will roll off the piston into contact with the cylinder and each packing bag on the right of the anchorage will roll out of contact with the cylinder into contact with the plunger but since the bags are filled with an uncompressible hydraulic fluid, there will be no change in the bags total volumetric capacity. However, since the bag is being rolled between the relative moving surfaces, it is obvious that for each inch of movement of the plunger, the bags or rather that part of the bags bounding the pump chamber will move in the same direction a half an inch. So as the pump plunger moves to the left, the abutment or shoulder defining the area of change in diameter will tend to move to the left in the pump chamber and so the capacity of the pump chamber will decrease, thus causing pump discharge. When the piston moves in the opposite direction, the reverse takes place, thus causing pump inspiration being controlled, of course, by the check valves as indicated.

For low pressures the inherent strength of the bags themselves, they are very narrow compared to their length, will be sufficient without any backing up of the other side of each bag and so the hydraulic packing fluid might be dispensed with but for heavier pressure, this packing fluid will be essential and since the areas between the O-rings and their respective pump bags will vary, the connection between the two areas is necessary because one area increases in capacity at exactly the same rate the other area decreases in capacity.

If the plunger is moved to the left independent of the driving mechanism as can be the case if the adjustment screw is rotated to cause the tappet to project far enough from the end of the plunger, the time will come as the plunger moves to the left when the shoulder defining the junction between the larger and smaller diameter portions of the plunger is masked by the left hand packing bag even with the cam at the position shown in Figure 2. Under these circumstances only a single diameter portion of the plunger will be exposed to the pump chamber. The pump plunger can reciprocate without any change in volumetric capacity of the pump chamber and so without any pumping action. Thus movement of the plunger independent of the driving mechanism may be such as to vary pump discharge from a maximum to zero without interruption of or interference with pump reciprocation.

If the adjustment of the plunger with respect to the driving means moves the dividing line to the left, then the left hand packing bag will mask the shoulder and reciprocation will merely result in a back and forth movement of the larger portion of the plunger in the pump chamber. If the adjustment is in the opposite direction, the only difference will be that the smaller diameter of the plunger will reciprocate in the pump chamber. In either case, no pumping takes place unless the shoulder between the big and little diameters is, during at least part of its reciprocation, in the area defined between the packing bags.

Preferably the bags are filled with incompressible hydraulic packing fluid. Under these circumstances the bags may expand and contract. Under other circumstances, the packing bag might be compressible itself, in which case it would only be necessary to be flexible, they would not have to expand and contract in volume.

I have shown as a convenient means for filling the bags or sleeves or tubes 8 with the hydraulic sealing fluid a connection between the interior of the bags and the pump chamber. Obviously if it were desired to pump a different fluid from the fluid to be used to inflate or fill the bags, the connection between the sealing bags or sacks and the pump chamber could be omitted and the filling of the packing means could take place entirely through the tube 16 and the opening closed at the end of the piston by the plug 17 and obviously, any desired pressure could be built up.

Under ordinary circumstances, the pressure in the two areas between the bags 8 and the members 6 will be slightly less than the pressure in the pump chamber itself. Even if the pump works at low pressure, no pressure at all is needed at this time. The important thing is that when the metering pump chamber is of uniform volume throughout its entire stroke as it will be when the shoulder 7 is masked during the entire stroke by one or other of the bags 8, a change in displacement will occur and that change is compensated for not by discharge from the pump but by expansion or contraction of the sealing bags against the pressure at the outer ends of those bags. With this arrangement zero discharge of the pump can be assured.

I have shown the ducts leading the fluid into the sealing bags as being in the piston which is of course a convenient arrangement but it is equally possible that those ducts might be in the housing wall and accomplish the same result.

I claim:

1. In a pump housing, a cylindrical open ended chamber, a cylindrical plunger projecting at each end therefrom, out of contact with the walls thereof, one end of the plunger being of greater diameter than the other, separate packing means between the plunger and the cylinder, spaced therealong to define a pump chamber, valves controlling intake to and exhaust from the pump chamber, uniform stroke, reciprocating driving means for the plunger, adjusting means for moving the plunger with respect to the driving means to adjust the position, in the chamber, of the junction between the different diameter portions of the plunger, each packing means comprising a closed flexible, extensible walled sack rigidly anchored on one side to the housing and on the other to the plunger, longitudinally extending in both directions from the anchorage, in the annulus between the plunger and the housing, incompressible hydraulic fluid filling such sack and expanding it against the opposed walls of the annulus.

2. In a pumping housing, a cylindrical open ended chamber, a cylindrical plunger projecting at each end therefrom, out of contact with the walls thereof, one end of the plunger being of greater diameter than the other, separate packing means between the plunger and the cylinder, spaced therealong to define a pump chamber, valves controlling intake to and exhaust from the pump chamber, uniform stroke, reciprocating driving means for the plunger, adjusting means for moving the plunger with respect to the driving means to adjust the position, in the chamber, of the junction between the different diameter portions of the plunger, and to cause such junction to be masked by one of the packing means throughout an entire pump stroke, each packing means comprising a closed flexible, extensible walled sack rigidly anchored on one side to the housing and on the other to the plunger, longitudinally extending in both directions from the anchorage, in the annulus between the plunger and the housing, incompressible hydraulic fluid filling such sack and expanding it against the opposed walls of the annulus.

3. In a pump housing, a cylindrical open ended chamber, a cylindrical plunger projecting at each end therefrom, out of contact with the walls thereof, one end of the plunger being of greater diameter than the other, separate packing means between the plunger and the cylinder, spaced therealong to define a pump chamber, valves controlling intake to and exhaust from the pump chamber, uniform stroke, reciprocating driving means for the plunger, adjusting means for moving the plunger with respect to the driving means to adjust the position, in the chamber, of the junction between the different diameter portions of the plunger, each packing means comprising a closed flexible walled sack rigidly anchored on one side to the housing and on the other to the plunger, longitudinally extending in both directions from the anchorage, in the annulus between the plunger and the housing, a fluid filling such sack and expanding it against the opposed walls of the annulus.

4. In a pump housing, a cylindrical open ended chamber, a cylindrical plunger projecting at each end therefrom, out of contact with the walls thereof, one end of the plunger being of greater diameter than the other, separate packing means between the plunger and the cylinder, spaced therealong to define a pump chamber, valves controlling intake to and exhaust from the pump chamber, uniform stroke, reciprocating driving means for the plunger, adjusting means for moving the plunger with respect to the driving means to adjust the position, in the chamber, of the junction between the different diameter portions of the plunger, and to cause such junction to be masked by one of the packing means throughout an entire pump stroke, each packing means comprising a closed flexible walled sack rigidly anchored on one side to the housing and on the other to the plunger, longitudinally extending in both directions from the anchorage, in the annulus between the plunger and the housing, a fluid filling such sack and expanding it against the opposed walls of the annulus.

5. A metering pump comprising a hollow cylindrical body open at both ends, a pump plunger therein, extending outwardly through the open ends thereof, means for maintaining it in concentric position with respect to the cylinder and means for reciprocating it, annular elongated bag like packing members located within the annular space between the pump and cylinder spaced therealong and defining an annular pump chamber, the bags being permanently attached intermediate their ends on opposite sides respectively to the cylinder and the plunger, means for expanding the bags to fill the annular space between the cylinder and plunger while permitting the opposite ends of each bag to roll onto and off of the opposed plunger and cylinder surfaces as the plunger reciprocates, one end of the plunger being of greater diameter than the other, there being a shoulder joining the two diameters, said shoulder located normally within the space between the bags, means for longitudinally displacing the plunger independent of the reciprocating means whereby one diameter portion of the plunger may be brought into masking contact during the entire pump stroke with the bag normally associated with the other diameter of the plunger.

References Cited in the file of this patent

UNITED STATES PATENTS

| | | |
|---|---|---|
| 673,602 | Fox | May 7, 1901 |
| 1,571,845 | Lefebvre | Feb. 2, 1926 |
| 2,291,889 | Evans et al. | Aug. 4, 1942 |
| 2,431,070 | Nelson | Nov. 18, 1947 |
| 2,578,265 | Saalfrank | Dec. 11, 1951 |
| 2,613,610 | Saalfrank | Oct. 14, 1952 |
| 2,757,542 | Klingler | Aug. 7, 1956 |
| 2,808,003 | Staege | Oct. 1, 1957 |
| 2,820,415 | Born | Jan. 21, 1958 |

FOREIGN PATENTS

| | | |
|---|---|---|
| 8,851 | Great Britain | of 1896 |
| 508,552 | Germany | Sept. 27, 1930 |